United States Patent
Morrell et al.

(10) Patent No.: US 10,126,817 B2
(45) Date of Patent: Nov. 13, 2018

(54) DEVICES AND METHODS FOR CREATING HAPTIC EFFECTS

(71) Applicant: Apple Inc., Cupertino, CA (US)

(72) Inventors: John B. Morrell, Cupertino, CA (US); Patrick Kessler, San Francisco, CA (US); Camille Moussette, Cupertino, CA (US)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 15/025,277

(22) PCT Filed: Sep. 29, 2013

(86) PCT No.: PCT/US2013/062517
§ 371 (c)(1),
(2) Date: Mar. 27, 2016

(87) PCT Pub. No.: WO2015/047364
PCT Pub. Date: Apr. 2, 2015

(65) Prior Publication Data
US 2016/0216764 A1    Jul. 28, 2016

(51) Int. Cl.
*G06F 3/01* (2006.01)
*G08B 6/00* (2006.01)

(52) U.S. Cl.
CPC .............. *G06F 3/016* (2013.01); *G08B 6/00* (2013.01)

(58) Field of Classification Search
CPC .............. G06F 3/016; G06F 3/01; G08B 6/00
See application file for complete search history.

(56) References Cited

U.S. PATENT DOCUMENTS 3,001,049 A    9/1961 Didier
3,390,287 A    6/1968 Sonderegger
(Continued)

FOREIGN PATENT DOCUMENTS

AU    2015100710    7/2015
AU    2016100399    5/2016
(Continued)

OTHER PUBLICATIONS

Nakamura, A Torso Haptic Display based on Shape Memory Alloy Actuators, 2003, Massachusetts Institute of Technology, pp. 1-123.*
(Continued)

*Primary Examiner* — Brian Wilson
(74) *Attorney, Agent, or Firm* — Brownstein Hyatt Farber Schreck, LLP

(57) ABSTRACT

In an embodiment for use with a portable device, a haptic feedback system creates a haptic pop effect and the system may include a mechanism configured to produce a haptic pop effect and a controller electronically coupled with the mechanism to selectively activate the mechanism. In one example, the mechanism has a first normal state having mechanical energy stored therein, and a second state wherein said mechanical energy is released, thereby creating the haptic pop effect. The mechanism may include a material portion configured as a dome-shaped or arcuate diaphragm and made of metal that stores mechanical energy therein. A conductor such as a Nitinol wire may be positioned about and bonded to the perimeter of the material, and has a variable length of a first length to a shorter second length in response to the signal being applied to the mechanism. In this manner, the controller provides an electrical signal to the mechanism, and the mechanism responds to the electrical signal by activating the haptic pop effect. This effect is felt by the user of the electronic device.

20 Claims, 8 Drawing Sheets

(56) References Cited

U.S. PATENT DOCUMENTS

| | | |
|---|---|---|
| 3,419,739 A | 12/1968 | Clements |
| 4,236,132 A | 11/1980 | Zissimopoulos |
| 4,412,148 A | 10/1983 | Klicker et al. |
| 4,414,984 A | 11/1983 | Zarudiansky |
| 4,695,813 A | 9/1987 | Nobutoki et al. |
| 4,975,616 A | 12/1990 | Park |
| 5,010,772 A | 4/1991 | Bourland |
| 5,245,734 A | 9/1993 | Issartel |
| 5,283,408 A | 2/1994 | Chen |
| 5,293,161 A | 3/1994 | MacDonald et al. |
| 5,317,221 A | 5/1994 | Kubo et al. |
| 5,365,140 A | 11/1994 | Ohya et al. |
| 5,434,549 A | 7/1995 | Hirabayashi et al. |
| 5,436,622 A | 7/1995 | Gutman et al. |
| 5,510,584 A | 4/1996 | Norris |
| 5,510,783 A | 4/1996 | Findlater et al. |
| 5,513,100 A | 4/1996 | Parker et al. |
| 5,587,875 A | 12/1996 | Sellers |
| 5,590,020 A | 12/1996 | Sellers |
| 5,602,715 A | 2/1997 | Lempicki et al. |
| 5,619,005 A | 4/1997 | Shibukawa et al. |
| 5,621,610 A | 4/1997 | Moore et al. |
| 5,625,532 A | 4/1997 | Sellers |
| 5,629,578 A | 5/1997 | Winzer et al. |
| 5,635,928 A | 6/1997 | Takagi et al. |
| 5,718,418 A | 2/1998 | Gugsch |
| 5,739,759 A | 4/1998 | Nakazawa et al. |
| 5,742,242 A | 4/1998 | Sellers |
| 5,783,765 A | 7/1998 | Muramatsu |
| 5,793,605 A | 8/1998 | Sellers |
| 5,812,116 A | 9/1998 | Malhi |
| 5,813,142 A | 9/1998 | Demon |
| 5,818,149 A | 10/1998 | Safari et al. |
| 5,896,076 A | 4/1999 | Van Namen |
| 5,907,199 A | 5/1999 | Miller |
| 5,951,908 A | 9/1999 | Cui et al. |
| 5,959,613 A | 9/1999 | Rosenberg et al. |
| 5,973,441 A * | 10/1999 | Lo .................. H01L 41/098 310/330 |
| 5,982,304 A | 11/1999 | Selker et al. |
| 5,982,612 A | 11/1999 | Roylance |
| 5,995,026 A | 11/1999 | Sellers |
| 5,999,084 A | 12/1999 | Armstrong |
| 6,069,433 A | 5/2000 | Lazarus et al. |
| 6,078,308 A | 6/2000 | Rosenberg et al. |
| 6,127,756 A | 10/2000 | Iwaki |
| 6,135,886 A | 10/2000 | Armstrong |
| 6,218,966 B1 | 4/2001 | Goodwin |
| 6,220,550 B1 * | 4/2001 | McKillip, Jr. .......... B64C 13/50 114/144 R |
| 6,222,525 B1 | 4/2001 | Armstrong |
| 6,252,336 B1 | 6/2001 | Hall |
| 6,342,880 B2 | 1/2002 | Rosenberg et al. |
| 6,351,205 B1 | 2/2002 | Armstrong |
| 6,373,465 B2 | 4/2002 | Jolly et al. |
| 6,408,187 B1 | 6/2002 | Merriam |
| 6,411,276 B1 | 6/2002 | Braun et al. |
| 6,429,849 B1 | 8/2002 | An |
| 6,438,393 B1 | 8/2002 | Surronen |
| 6,444,928 B2 | 9/2002 | Okamoto et al. |
| 6,455,973 B1 | 9/2002 | Ineson |
| 6,465,921 B1 | 10/2002 | Horng |
| 6,552,404 B1 | 4/2003 | Hynes |
| 6,552,471 B1 | 4/2003 | Chandran et al. |
| 6,557,072 B2 | 4/2003 | Osborn |
| 6,642,857 B1 | 11/2003 | Schediwy |
| 6,693,626 B1 | 2/2004 | Rosenberg |
| 6,717,573 B1 | 4/2004 | Shahoian et al. |
| 6,809,462 B2 | 10/2004 | Pelrine et al. |
| 6,809,727 B2 | 10/2004 | Piot et al. |
| 6,864,877 B2 | 3/2005 | Braun et al. |
| 6,906,697 B2 | 6/2005 | Rosenberg |
| 6,906,700 B1 | 6/2005 | Armstrong |
| 6,906,703 B2 | 6/2005 | Vablais et al. |
| 6,952,203 B2 | 10/2005 | Banerjee et al. |
| 6,954,657 B2 | 10/2005 | Bork et al. |
| 6,963,762 B2 | 11/2005 | Kaaresoja et al. |
| 6,995,752 B2 | 2/2006 | Lu |
| 7,005,811 B2 | 2/2006 | Wakuda et al. |
| 7,016,707 B2 | 3/2006 | Fujisawa et al. |
| 7,022,927 B2 | 4/2006 | Hsu |
| 7,023,112 B2 | 4/2006 | Miyamoto et al. |
| 7,081,701 B2 | 7/2006 | Yoon et al. |
| 7,091,948 B2 | 8/2006 | Chang et al. |
| 7,121,147 B2 | 10/2006 | Okada |
| 7,123,948 B2 | 10/2006 | Nielsen |
| 7,130,664 B1 | 10/2006 | Williams |
| 7,136,045 B2 | 11/2006 | Rosenberg et al. |
| 7,161,580 B2 | 1/2007 | Bailey et al. |
| 7,162,928 B2 | 1/2007 | Shank et al. |
| 7,170,498 B2 | 1/2007 | Huang |
| 7,176,906 B2 | 2/2007 | Williams et al. |
| 7,180,500 B2 | 2/2007 | Marvit et al. |
| 7,182,691 B1 | 2/2007 | Schena |
| 7,194,645 B2 | 3/2007 | Bieswanger et al. |
| 7,217,891 B2 | 5/2007 | Fischer et al. |
| 7,218,310 B2 | 5/2007 | Tierling et al. |
| 7,219,561 B2 | 5/2007 | Okada |
| 7,253,350 B2 | 8/2007 | Noro et al. |
| 7,269,484 B2 | 9/2007 | Hein |
| 7,333,604 B2 | 2/2008 | Zernovizky et al. |
| 7,334,350 B2 | 2/2008 | Ellis |
| 7,348,968 B2 | 3/2008 | Dawson |
| 7,388,741 B2 | 6/2008 | Konuma et al. |
| 7,392,066 B2 | 6/2008 | Hapamas |
| 7,423,631 B2 | 9/2008 | Shahoian et al. |
| 7,446,752 B2 | 11/2008 | Goldenberg et al. |
| 7,469,595 B2 | 12/2008 | Kessler et al. |
| 7,495,358 B2 | 2/2009 | Kobayashi et al. |
| 7,508,382 B2 | 3/2009 | Denoue et al. |
| 7,561,142 B2 | 7/2009 | Shahoian et al. |
| 7,562,468 B2 | 7/2009 | Ellis |
| 7,569,086 B2 | 8/2009 | Chandran |
| 7,575,368 B2 | 8/2009 | Guillaume |
| 7,586,220 B2 | 9/2009 | Roberts |
| 7,619,498 B2 | 11/2009 | Miura |
| 7,639,232 B2 | 12/2009 | Grant et al. |
| 7,641,618 B2 | 1/2010 | Noda et al. |
| 7,675,253 B2 | 3/2010 | Dorel |
| 7,675,414 B2 | 3/2010 | Ray |
| 7,679,611 B2 | 3/2010 | Schena |
| 7,707,742 B2 | 5/2010 | Ellis |
| 7,710,399 B2 | 5/2010 | Bruneau et al. |
| 7,732,951 B2 | 6/2010 | Mukaide |
| 7,737,828 B2 | 6/2010 | Yang et al. |
| 7,742,036 B2 | 6/2010 | Grant et al. |
| 7,788,032 B2 | 8/2010 | Moloney |
| 7,793,429 B2 | 9/2010 | Ellis |
| 7,793,430 B2 | 9/2010 | Ellis |
| 7,798,982 B2 | 9/2010 | Zets et al. |
| 7,868,489 B2 | 1/2011 | Amemiya et al. |
| 7,886,621 B2 | 2/2011 | Smith et al. |
| 7,888,892 B2 | 2/2011 | McReynolds et al. |
| 7,919,945 B2 | 4/2011 | Houston et al. |
| 7,929,382 B2 | 4/2011 | Yamazaki |
| 7,946,483 B2 | 5/2011 | Miller et al. |
| 7,952,261 B2 | 5/2011 | Lipton et al. |
| 7,952,566 B2 | 5/2011 | Poupyrev et al. |
| 7,956,770 B2 | 6/2011 | Klinghult et al. |
| 7,961,909 B2 | 6/2011 | Mandella et al. |
| 8,031,172 B2 | 10/2011 | Kruse et al. |
| 8,044,940 B2 | 10/2011 | Narusawa |
| 8,069,881 B1 | 12/2011 | Cunha |
| 8,072,418 B2 | 12/2011 | Crawford et al. |
| 8,077,145 B2 | 12/2011 | Rosenberg et al. |
| 8,081,156 B2 | 12/2011 | Ruettiger |
| 8,082,640 B2 | 12/2011 | Takeda |
| 8,098,234 B2 | 1/2012 | Lacroix et al. |
| 8,123,660 B2 | 2/2012 | Kruse et al. |
| 8,125,453 B2 | 2/2012 | Shahoian et al. |
| 8,141,276 B2 | 3/2012 | Ellis |
| 8,156,809 B2 | 4/2012 | Tierling et al. |
| 8,169,401 B2 | 5/2012 | Hardwick |
| 8,174,372 B2 | 5/2012 | da Costa |

(56) References Cited

U.S. PATENT DOCUMENTS

| | | |
|---|---|---|
| 8,179,202 B2 | 5/2012 | Cruz-Hernandez et al. |
| 8,188,623 B2 | 5/2012 | Park et al. |
| 8,205,356 B2 | 6/2012 | Ellis |
| 8,210,942 B2 | 7/2012 | Shimabukuro et al. |
| 8,232,494 B2 | 7/2012 | Purcocks |
| 8,248,277 B2 | 8/2012 | Peterson et al. |
| 8,248,278 B2 | 8/2012 | Schlosser et al. |
| 8,253,686 B2 | 8/2012 | Kyung et al. |
| 8,255,004 B2 | 8/2012 | Huang et al. |
| 8,261,468 B2 | 9/2012 | Ellis |
| 8,264,465 B2 | 9/2012 | Grant et al. |
| 8,270,114 B2 | 9/2012 | Argumedo et al. |
| 8,288,899 B2 | 10/2012 | Park et al. |
| 8,291,614 B2 | 10/2012 | Ellis |
| 8,294,600 B2 | 10/2012 | Peterson et al. |
| 8,315,746 B2 | 11/2012 | Cox et al. |
| 8,344,834 B2 | 1/2013 | Niiyama |
| 8,378,797 B2 | 2/2013 | Pance et al. |
| 8,378,798 B2 | 2/2013 | Bells et al. |
| 8,378,965 B2 | 2/2013 | Gregorio et al. |
| 8,384,316 B2 | 2/2013 | Houston et al. |
| 8,384,679 B2 | 2/2013 | Paleczny et al. |
| 8,390,594 B2 | 3/2013 | Modarres et al. |
| 8,395,587 B2 | 3/2013 | Cauwels et al. |
| 8,398,570 B2 | 3/2013 | Mortimer et al. |
| 8,411,058 B2 | 4/2013 | Wong et al. |
| 8,446,264 B2 | 5/2013 | Tanase |
| 8,451,255 B2 | 5/2013 | Weber et al. |
| 8,461,951 B2 | 6/2013 | Gassmann et al. |
| 8,466,889 B2 | 6/2013 | Tong et al. |
| 8,471,690 B2 | 6/2013 | Hennig et al. |
| 8,487,759 B2 | 7/2013 | Hill |
| 8,515,398 B2 | 8/2013 | Song et al. |
| 8,542,134 B2 | 9/2013 | Peterson et al. |
| 8,545,322 B2 | 10/2013 | George et al. |
| 8,547,341 B2 | 10/2013 | Takashima et al. |
| 8,552,859 B2 | 10/2013 | Pakula et al. |
| 8,570,291 B2 | 10/2013 | Motomura |
| 8,575,794 B2 | 11/2013 | Lee et al. |
| 8,587,955 B2 | 11/2013 | Difonzo et al. |
| 8,596,755 B2 | 12/2013 | Hibi |
| 8,598,893 B2 | 12/2013 | Camus |
| 8,599,047 B2 | 12/2013 | Schlosser et al. |
| 8,599,152 B1 | 12/2013 | Wurtenberger et al. |
| 8,600,354 B2 | 12/2013 | Esaki |
| 8,614,431 B2 | 12/2013 | Huppi et al. |
| 8,621,348 B2 | 12/2013 | Ramsay et al. |
| 8,629,843 B2 | 1/2014 | Steeves et al. |
| 8,633,916 B2 | 1/2014 | Bernstein et al. |
| 8,674,941 B2 | 3/2014 | Casparian et al. |
| 8,680,723 B2 | 3/2014 | Subramanian |
| 8,681,092 B2 | 3/2014 | Harada et al. |
| 8,682,396 B2 | 3/2014 | Yang et al. |
| 8,686,952 B2 | 4/2014 | Pope et al. |
| 8,710,966 B2 | 4/2014 | Hill |
| 8,723,813 B2 | 5/2014 | Park et al. |
| 8,735,755 B2 | 5/2014 | Peterson et al. |
| 8,760,273 B2 | 6/2014 | Casparian et al. |
| 8,780,060 B2 | 7/2014 | Maschmeyer et al. |
| 8,787,006 B2 | 7/2014 | Golko et al. |
| 8,797,152 B2 | 8/2014 | Henderson et al. |
| 8,798,534 B2 | 8/2014 | Rodriguez et al. |
| 8,836,502 B2 | 9/2014 | Culbert et al. |
| 8,845,071 B2 | 9/2014 | Yamamoto et al. |
| 8,857,248 B2 | 10/2014 | Shih et al. |
| 8,860,562 B2 | 10/2014 | Hill |
| 8,861,776 B2 | 10/2014 | Lastrucci |
| 8,866,600 B2 | 10/2014 | Yang et al. |
| 8,890,668 B2 | 11/2014 | Pance et al. |
| 8,918,215 B2 | 12/2014 | Bosscher et al. |
| 8,928,621 B2 | 1/2015 | Ciesla et al. |
| 8,948,821 B2 | 2/2015 | Newham et al. |
| 8,970,534 B2 | 3/2015 | Adachi et al. |
| 8,976,141 B2 | 3/2015 | Myers et al. |
| 9,008,730 B2 | 4/2015 | Kim et al. |
| 9,012,795 B2 | 4/2015 | Niu |
| 9,013,426 B2 | 4/2015 | Cole et al. |
| 9,019,088 B2 | 4/2015 | Zawacki et al. |
| 9,035,887 B1 | 5/2015 | Prud'Hommeaux et al. |
| 9,072,576 B2 | 7/2015 | Nishiura |
| 9,083,821 B2 | 7/2015 | Hughes |
| 9,092,129 B2 | 7/2015 | Abdo et al. |
| 9,098,991 B2 | 8/2015 | Park et al. |
| 9,122,325 B2 | 9/2015 | Peshkin et al. |
| 9,131,039 B2 | 9/2015 | Behles |
| 9,134,834 B2 | 9/2015 | Reshef |
| 9,158,379 B2 | 10/2015 | Cruz-Hernandez et al. |
| 9,178,509 B2 | 11/2015 | Bernstein |
| 9,189,932 B2 | 11/2015 | Kerdemelidis et al. |
| 9,201,458 B2 | 12/2015 | Hunt et al. |
| 9,202,355 B2 | 12/2015 | Hill |
| 9,235,267 B2 | 1/2016 | Pope et al. |
| 9,274,601 B2 | 3/2016 | Faubert et al. |
| 9,274,602 B2 | 3/2016 | Garg et al. |
| 9,274,603 B2 | 3/2016 | Modarres et al. |
| 9,275,815 B2 | 3/2016 | Hoffmann |
| 9,293,054 B2 | 3/2016 | Bruni et al. |
| 9,300,181 B2 | 3/2016 | Maeda et al. |
| 9,310,906 B2 | 4/2016 | Yumiki et al. |
| 9,317,116 B2 | 4/2016 | Ullrich et al. |
| 9,317,118 B2 | 4/2016 | Puskarich |
| 9,318,942 B2 | 4/2016 | Sugita et al. |
| 9,325,230 B2 | 4/2016 | Yamada et al. |
| 9,357,052 B2 | 5/2016 | Ullrich |
| 9,360,944 B2 | 6/2016 | Pinault |
| 9,390,599 B2 | 7/2016 | Weinberg |
| 9,396,434 B2 | 7/2016 | Rothkopf |
| 9,405,369 B2 | 8/2016 | Modarres et al. |
| 9,417,695 B2 | 8/2016 | Griffin et al. |
| 9,449,476 B2 | 9/2016 | Lynn |
| 9,477,342 B2 | 10/2016 | Daverman et al. |
| 9,501,912 B1 | 11/2016 | Havskjold et al. |
| 9,594,450 B2 | 7/2017 | Lynn et al. |
| 9,778,743 B2 | 10/2017 | Grant et al. |
| 9,779,592 B1 | 10/2017 | Hoen |
| 9,934,661 B2 | 4/2018 | Hill |
| 9,990,099 B2 | 6/2018 | Ham et al. |
| 2003/0210259 A1 | 11/2003 | Liu |
| 2004/0021663 A1 | 2/2004 | Suzuki et al. |
| 2004/0127198 A1 | 7/2004 | Roskind et al. |
| 2005/0057528 A1 | 3/2005 | Kleen |
| 2005/0107129 A1 | 5/2005 | Kaewell et al. |
| 2005/0110778 A1 | 5/2005 | Ben Ayed |
| 2005/0118922 A1 | 6/2005 | Endo |
| 2005/0217142 A1 | 10/2005 | Ellis |
| 2005/0237306 A1 | 10/2005 | Klein et al. |
| 2005/0248549 A1 | 11/2005 | Dietz et al. |
| 2005/0258715 A1 | 11/2005 | Schlabach |
| 2006/0014569 A1 | 1/2006 | DelGiorno |
| 2006/0154674 A1 | 7/2006 | Landschaft et al. |
| 2006/0209037 A1 | 9/2006 | Wang et al. |
| 2006/0239746 A1 | 10/2006 | Grant |
| 2006/0252463 A1 | 11/2006 | Liao |
| 2007/0099574 A1 | 5/2007 | Wang |
| 2007/0152974 A1 | 7/2007 | Kim et al. |
| 2007/0178942 A1 | 8/2007 | Sadler et al. |
| 2007/0188450 A1 | 8/2007 | Hernandez et al. |
| 2008/0084384 A1 | 4/2008 | Gregorio et al. |
| 2008/0158149 A1 | 7/2008 | Levin |
| 2008/0165148 A1 | 7/2008 | Williamson |
| 2008/0169911 A1 | 7/2008 | Klinghult et al. |
| 2008/0181501 A1 | 7/2008 | Faraboschi |
| 2008/0181706 A1 | 7/2008 | Jackson |
| 2008/0192014 A1 | 8/2008 | Kent et al. |
| 2008/0204428 A1 | 8/2008 | Pierce et al. |
| 2008/0255794 A1 | 10/2008 | Levine |
| 2009/0002328 A1 | 1/2009 | Ullrich et al. |
| 2009/0115734 A1 | 5/2009 | Fredriksson et al. |
| 2009/0120105 A1 | 5/2009 | Ramsay et al. |
| 2009/0128503 A1 | 5/2009 | Grant et al. |
| 2009/0135142 A1 | 5/2009 | Fu et al. |
| 2009/0167702 A1 | 7/2009 | Nurmi |
| 2009/0167704 A1 | 7/2009 | Terlizzi et al. |
| 2009/0218148 A1 | 9/2009 | Hugeback et al. |

(56) References Cited

U.S. PATENT DOCUMENTS

| | | |
|---|---|---|
| 2009/0225046 A1 | 9/2009 | Kim et al. |
| 2009/0236210 A1 | 9/2009 | Clark et al. |
| 2009/0267892 A1 | 10/2009 | Faubert |
| 2009/0313542 A1 | 12/2009 | Cruz-Hernandez et al. |
| 2010/0020036 A1 | 1/2010 | Hui et al. |
| 2010/0053087 A1 | 3/2010 | Dai et al. |
| 2010/0079264 A1 | 4/2010 | Hoellwarth |
| 2010/0089735 A1 | 4/2010 | Takeda et al. |
| 2010/0141408 A1 | 6/2010 | Doy et al. |
| 2010/0141606 A1 | 6/2010 | Bae et al. |
| 2010/0152620 A1 | 6/2010 | Ramsay et al. |
| 2010/0164894 A1 | 7/2010 | Kim et al. |
| 2010/0188422 A1 | 7/2010 | Shingai et al. |
| 2010/0194547 A1 | 8/2010 | Terrell et al. |
| 2010/0231508 A1 | 9/2010 | Cruz-Hernandez et al. |
| 2010/0231550 A1 | 9/2010 | Cruz-Hernandez et al. |
| 2010/0265197 A1 | 10/2010 | Purdy |
| 2010/0309141 A1 | 12/2010 | Cruz-Hernandez et al. |
| 2010/0328229 A1 | 12/2010 | Weber et al. |
| 2011/0012717 A1* | 1/2011 | Pance ............ G06F 3/016 340/407.2 |
| 2011/0053577 A1 | 3/2011 | Lee et al. |
| 2011/0107958 A1 | 5/2011 | Pance et al. |
| 2011/0121765 A1 | 5/2011 | Anderson et al. |
| 2011/0128239 A1 | 6/2011 | Polyakov et al. |
| 2011/0148608 A1* | 6/2011 | Grant ............ G06F 1/1626 340/407.2 |
| 2011/0163985 A1 | 7/2011 | Bae et al. |
| 2011/0193824 A1 | 8/2011 | Modarres et al. |
| 2011/0248948 A1 | 10/2011 | Griffin et al. |
| 2011/0260988 A1 | 10/2011 | Colgate et al. |
| 2011/0263200 A1 | 10/2011 | Thornton et al. |
| 2011/0291950 A1 | 12/2011 | Tong |
| 2011/0304559 A1 | 12/2011 | Pasquero |
| 2012/0068957 A1 | 3/2012 | Puskarich et al. |
| 2012/0075198 A1 | 3/2012 | Sulem et al. |
| 2012/0092263 A1 | 4/2012 | Peterson et al. |
| 2012/0126959 A1 | 5/2012 | Zarrabi et al. |
| 2012/0127088 A1 | 5/2012 | Pance et al. |
| 2012/0133494 A1 | 5/2012 | Cruz-Hernandez et al. |
| 2012/0139844 A1 | 6/2012 | Ramstein et al. |
| 2012/0206248 A1 | 8/2012 | Biggs |
| 2012/0256848 A1 | 10/2012 | Madabusi Srinivasan |
| 2012/0268412 A1 | 10/2012 | Cruz-Hernandez et al. |
| 2012/0274578 A1 | 11/2012 | Snow et al. |
| 2012/0280927 A1 | 11/2012 | Ludwig |
| 2012/0319987 A1 | 12/2012 | Woo |
| 2012/0327006 A1 | 12/2012 | Israr et al. |
| 2013/0027345 A1 | 1/2013 | Binzel |
| 2013/0033967 A1 | 2/2013 | Chuang et al. |
| 2013/0063285 A1 | 3/2013 | Elias |
| 2013/0063356 A1 | 3/2013 | Martisauskas |
| 2013/0106699 A1 | 5/2013 | Babatunde |
| 2013/0141365 A1 | 6/2013 | Lynn et al. |
| 2013/0191741 A1 | 7/2013 | Dickinson et al. |
| 2013/0200732 A1 | 8/2013 | Jun et al. |
| 2013/0207793 A1 | 8/2013 | Weaber et al. |
| 2013/0217491 A1 | 8/2013 | Hilbert et al. |
| 2013/0222280 A1 | 8/2013 | Sheynblat et al. |
| 2013/0228023 A1 | 9/2013 | Drasnin et al. |
| 2013/0261811 A1 | 10/2013 | Yagi et al. |
| 2013/0300590 A1 | 11/2013 | Dietz et al. |
| 2014/0035397 A1 | 2/2014 | Endo et al. |
| 2014/0082490 A1 | 3/2014 | Jung et al. |
| 2014/0085065 A1 | 3/2014 | Biggs et al. |
| 2014/0143785 A1 | 5/2014 | Mistry et al. |
| 2014/0197936 A1 | 7/2014 | Biggs et al. |
| 2014/0232534 A1 | 8/2014 | Birnbaum et al. |
| 2014/0247227 A1 | 9/2014 | Jiang et al. |
| 2014/0267076 A1 | 9/2014 | Birnbaum et al. |
| 2014/0267952 A1 | 9/2014 | Sirois |
| 2015/0005039 A1 | 1/2015 | Liu et al. |
| 2015/0040005 A1 | 2/2015 | Faaborg |
| 2015/0090572 A1 | 4/2015 | Lee et al. |
| 2015/0169059 A1 | 6/2015 | Behles et al. |
| 2015/0192414 A1 | 7/2015 | Das et al. |
| 2015/0194165 A1 | 7/2015 | Faaborg et al. |
| 2015/0220199 A1 | 8/2015 | Wang et al. |
| 2015/0227204 A1 | 8/2015 | Gipson et al. |
| 2015/0296480 A1 | 10/2015 | Kinsey et al. |
| 2015/0324049 A1 | 11/2015 | Kies et al. |
| 2015/0349619 A1 | 12/2015 | Degner et al. |
| 2016/0049265 A1 | 2/2016 | Bernstein |
| 2016/0063826 A1 | 3/2016 | Morrell et al. |
| 2016/0071384 A1 | 3/2016 | Hill |
| 2016/0162025 A1 | 6/2016 | Shah |
| 2016/0163165 A1 | 6/2016 | Morrell et al. |
| 2016/0172953 A1 | 6/2016 | Hamel et al. |
| 2016/0195929 A1 | 7/2016 | Martinez et al. |
| 2016/0196935 A1 | 7/2016 | Bernstein |
| 2016/0206921 A1 | 7/2016 | Szabados et al. |
| 2016/0211736 A1 | 7/2016 | Moussette et al. |
| 2016/0216766 A1 | 7/2016 | Puskarich |
| 2016/0231815 A1 | 8/2016 | Moussette et al. |
| 2016/0233012 A1 | 8/2016 | Lubinski et al. |
| 2016/0241119 A1 | 8/2016 | Keeler |
| 2016/0259480 A1 | 9/2016 | Augenbergs et al. |
| 2016/0306423 A1 | 10/2016 | Uttermann et al. |
| 2016/0371942 A1 | 12/2016 | Smith, IV et al. |
| 2017/0038905 A1 | 2/2017 | Bijamov et al. |
| 2017/0070131 A1 | 3/2017 | Degner et al. |
| 2017/0084138 A1 | 3/2017 | Hajati et al. |
| 2017/0085163 A1 | 3/2017 | Hajati et al. |
| 2017/0192507 A1 | 7/2017 | Lee et al. |
| 2017/0192508 A1 | 7/2017 | Lim et al. |
| 2017/0255295 A1 | 9/2017 | Tanemura et al. |
| 2017/0257844 A1 | 9/2017 | Miller et al. |
| 2017/0285747 A1 | 10/2017 | Chen |
| 2017/0311282 A1 | 10/2017 | Miller et al. |
| 2017/0357325 A1 | 12/2017 | Yang et al. |
| 2017/0364158 A1 | 12/2017 | Wen et al. |
| 2018/0052550 A1 | 2/2018 | Zhang et al. |
| 2018/0075715 A1 | 3/2018 | Morrell et al. |
| 2018/0081441 A1 | 3/2018 | Pedder et al. |
| 2018/0203513 A1 | 7/2018 | Rihn |

FOREIGN PATENT DOCUMENTS

| | | |
|---|---|---|
| CA | 2355434 | 2/2002 |
| CN | 1324030 | 11/2001 |
| CN | 1817321 | 8/2006 |
| CN | 101120290 | 2/2008 |
| CN | 101409164 | 4/2009 |
| CN | 101763192 | 6/2010 |
| CN | 101903848 | 12/2010 |
| CN | 101938207 | 1/2011 |
| CN | 102025257 | 4/2011 |
| CN | 201829004 | 5/2011 |
| CN | 102246122 | 11/2011 |
| CN | 102315747 | 1/2012 |
| CN | 102591512 | 7/2012 |
| CN | 102713805 | 10/2012 |
| CN | 102844972 | 12/2012 |
| CN | 102915111 | 2/2013 |
| CN | 103019569 | 4/2013 |
| CN | 103181090 | 6/2013 |
| CN | 103218104 | 7/2013 |
| CN | 103278173 | 9/2013 |
| CN | 103416043 | 11/2013 |
| CN | 104220963 | 12/2014 |
| DE | 19517630 | 11/1996 |
| DE | 10330024 | 1/2005 |
| DE | 102009038103 | 2/2011 |
| DE | 102011115762 | 4/2013 |
| EP | 0483955 | 5/1992 |
| EP | 1047258 | 10/2000 |
| EP | 1686776 | 8/2006 |
| EP | 2060967 | 5/2009 |
| EP | 2073099 | 6/2009 |
| EP | 2194444 | 6/2010 |
| EP | 2264562 A2 | 12/2010 |
| EP | 2315186 | 4/2011 |
| EP | 2374430 | 10/2011 |
| EP | 2395414 | 12/2011 |

(56) References Cited

FOREIGN PATENT DOCUMENTS

| | | |
|---|---|---|
| EP | 2461228 | 6/2012 |
| EP | 2631746 | 8/2013 |
| EP | 2434555 | 10/2013 |
| JP | H05301342 A2 | 11/1993 |
| JP | 2002199689 | 7/2002 |
| JP | 2002102799 | 9/2002 |
| JP | 200362525 | 3/2003 |
| JP | 2004236202 | 8/2004 |
| JP | 2010272903 | 12/2010 |
| JP | 2016095552 | 5/2016 |
| KR | 20050033909 | 4/2005 |
| KR | 1020100046602 | 5/2010 |
| KR | 1020110101516 | 9/2011 |
| KR | 20130024420 | 3/2013 |
| TW | 200518000 | 11/2007 |
| TW | 200951944 | 12/2009 |
| TW | 201145336 | 12/2011 |
| TW | 201218039 | 5/2012 |
| TW | 201425180 | 7/2014 |
| WO | WO 97/16932 | 5/1997 |
| WO | WO 01/059588 | 8/2001 |
| WO | WO 02/073587 | 9/2002 |
| WO | WO 03/038800 | 5/2003 |
| WO | WO 06/057770 | 6/2006 |
| WO | WO 07/114631 | 10/2007 |
| WO | WO 08/075082 | 6/2008 |
| WO | WO 09/038862 | 3/2009 |
| WO | WO 09/068986 | 6/2009 |
| WO | WO 09/097866 | 8/2009 |
| WO | WO 09/122331 | 10/2009 |
| WO | WO 09/150287 | 12/2009 |
| WO | WO 10/085575 | 7/2010 |
| WO | WO 10/087925 | 8/2010 |
| WO | WO 11/007263 | 1/2011 |
| WO | WO 12/052635 | 4/2012 |
| WO | WO 12/129247 | 9/2012 |
| WO | WO 13/069148 | 5/2013 |
| WO | WO 13/169302 | 11/2013 |
| WO | WO 14/018086 | 1/2014 |
| WO | WO 13/169299 | 11/2014 |
| WO | WO 15/023670 | 2/2015 |

OTHER PUBLICATIONS

U.S. Appl. No. 12/750,054, filed Mar. 30, 2010, Hill.
U.S. Appl. No. 12/887,455, filed Sep. 21, 2010, Puskarich et al.
U.S. Appl. No. 12/950,940, filed Nov. 19, 2010, Pance et al.
U.S. Appl. No. 13/630,867, filed Sep. 28, 2012, Bernstein.
U.S. Appl. No. 13/943,639, filed Jul. 16, 2013, Hill.
U.S. Appl. No. 14/059,693, filed Oct. 22, 2013, Puskarich.
U.S. Appl. No. 14/165,475, filed Jan. 27, 2014, Havskjold et al.
U.S. Appl. No. 14/493,190, filed Sep. 22, 2014, Hoen.
U.S. Appl. No. 14/512,927, filed Oct. 13, 2014, Hill.
U.S. Appl. No. 14/728,505, filed Jun. 2, 2015, Degner et al.
U.S. Appl. No. 14/841,582, filed Aug. 31, 2015, Morrell et al.
U.S. Appl. No. 14/928,465, filed Oct. 30, 2015, Bernstein.
U.S. Appl. No. 14/942,521, filed Nov. 16, 2015, Hill.
U.S. Appl. No. 14/910,108, filed Feb. 4, 2016, Martinez et al.
U.S. Appl. No. 15/045,761, filed Feb. 17, 2016, Morrell et al.
U.S. Appl. No. 15/046,194, filed Feb. 17, 2016, Degner et al.
U.S. Appl. No. 15/047,447, filed Feb. 18, 2016, Augenbergs et al.
U.S. Appl. No. 15/068,038, filed Mar. 11, 2016, Bernstein.
U.S. Appl. No. 15/025,243, filed Mar. 25, 2016, Keeler.
U.S. Appl. No. 15/025,425, filed Mar. 28, 2016, Moussette et al.
U.S. Appl. No. 15/025,250, filed Mar. 25, 2016, Moussette et al.
U.S. Appl. No. 15/025,254, filed Mar. 25, 2016, Lubinski et al.
U.S. Appl. No. 15/091,501, filed Apr. 5, 2016, Puskarich.
U.S. Appl. No. 15/098,669, filed Apr. 14, 2016, Uttermann et al.
U.S. Appl. No. 15/102,826, filed Jun. 8, 2016, Smith et al.
U.S. Appl. No. 15/251,459, filed Aug. 30, 2016, Miller et al.
U.S. Appl. No. 15/260,047, filed Sep. 8, 2016, Degner.
U.S. Appl. No. 15/306,034, filed Oct. 21, 2016, Bijamov et al.
U.S. Appl. No. 15/364,822, filed Nov. 30, 2016, Chen.
Astronomer's Toolbox, "The Electromagnetic Spectrum," http://imagine.gsfc.nasa.gov/science/toolbox/emspectrum1.html, updated Mar. 2013, 4 pages.
Hasser et al., "Preliminary Evaluation of a Shape-Memory Alloy Tactile Feedback Display," Advances in Robotics, Mechantronics, and Haptic Interfaces, ASME, DSC—vol. 49, pp. 73-80, 1993.
Hill et al., "Real-time Estimation of Human Impedance for Haptic Interfaces," Stanford Telerobotics Laboratory, Department of Mechanical Engineering, Stanford University, Third Joint Eurohaptics Conference and Symposium on Haptic Interfaces for Virtual Environment and Teleoperator Systems, Salt Lake City, Utah, Mar. 18-20, 2009, pp. 440-445.
Kim et al., "Tactile Rendering of 3D Features on Touch Surfaces," UIST '13, Oct. 8-11, 2013, St. Andrews, United Kingdom, 8 pages.
Lee et al, "Haptic Pen: Tactile Feedback Stylus for Touch Screens," Mitsubishi Electric Research Laboratories, http://wwwlmerl.com, 6 pages, Oct. 2004.
U.S. Appl. No. 15/621,966, filed Jun. 13, 2017, Pedder et al.
U.S. Appl. No. 15/621,930, filed Jun. 13, 2017, Wen et al.
U.S. Appl. No. 15/622,017, filed Jun. 13, 2017, Yang et al.
U.S. Appl. No. 15/641,192, filed Jul. 3, 2017, Miller et al.
U.S. Appl. No. 15/800,630, filed Nov. 1, 2017, Morrell et al.
U.S. Appl. No. 15/881,476, filed Jan. 26, 2018, Moussette et al.
U.S. Appl. No. 15/897,968, filed Feb. 15, 2018, Hill.
International Search Report and Written Opinion dated Apr. 15, 2014, PCT/US2013/062517, 10 pages.

* cited by examiner

DEVICES AND METHODS FOR CREATING HAPTIC EFFECTS

CROSS REFERENCE TO RELATED APPLICATION

This application is a 35 U.S.C. § 371 application of PCT/US2013/062517, filed on Sep. 29, 2013, and entitled "Devices and Methods for Creating Haptic Effects," which is incorporated by reference as if fully disclosed herein.

TECHNICAL FIELD

The present disclosure relates generally to methods and apparatuses for providing haptic feedback, and more particularly relates to methods and apparatus for providing a rapid haptic response.

BACKGROUND

The term "haptic" refers to touch or tactile sensation, and the term "haptic feedback system" refers to a system configured to provide a selective tactile feedback sensation (such as a vibration or other physical sensation, etc.) at a contact location of a surface in response to contact of a user at that location.

Such haptic feedback systems often include one or more actuators (such as piezoelectric transducers, electromechanical devices, and/or other vibration inducing devices) and drive electronics coupled to the one or more actuators cause the actuators to induce a selected vibratory response into the surface to which they are attached, thereby providing a tactile sensation to a user.

Conventional haptic effects in devices such as mobile phones or tablet computers include vibratory sensations or pulsing sensation.

As recognized by the present inventors, what is needed is a new class of haptic effect to provide an additional type of haptic effect to a user.

SUMMARY

According to one broad aspect of one embodiment, disclosed herein is a haptic feedback system for a portable device, wherein the system includes a mechanism configured to produce a haptic pop effect and a controller electronically coupled with the mechanism to selectively activate the mechanism. In one example, the mechanism has a first normal state having mechanical energy stored therein, and a second state wherein said mechanical energy is released, thereby creating the haptic pop effect.

In one example, the mechanism may include a material portion configured as a dome-shaped or arcuate diaphragm and made of metal having a generally flat profile with a generally circular shape that stores mechanical energy therein. A conductor may be positioned about and bonded to the perimeter of the material. In one example, the conductor has a variable length of a first length to a shorter second length in response to the signal being applied to the mechanism. In one example, the conductor is a Nitinol wire. In another example, a dampener may be positioned adjacent to the mechanism, wherein the dampener is configured to provide varying levels of dampening.

In this manner, the controller provides an electrical signal to the mechanism, and the mechanism responds to the electrical signal by activating the haptic pop effect. This effect is felt by the user of the electronic device.

According to another broad aspect of another embodiment, disclosed herein is a method of providing haptic feedback in an electronic device. In one example, the method comprises the acts of providing a mechanism having a selectable first second state in response to an electrical signal, the first state with mechanical energy stored therein, and the second state wherein said mechanical energy is released to produce a haptic pop effect; detecting a request for producing the haptic pop effect; and providing the electrical signal to the mechanism, whereby in response to the electrical signal, the mechanism transitions into the second state thereby producing the haptic pop effect.

Other embodiments are described herein, The features, utilities and advantages of various embodiments of the disclosure will be apparent from the following more particular description of embodiments as illustrated in the accompanying drawings.

DETAILED DESCRIPTION

Figure 1:
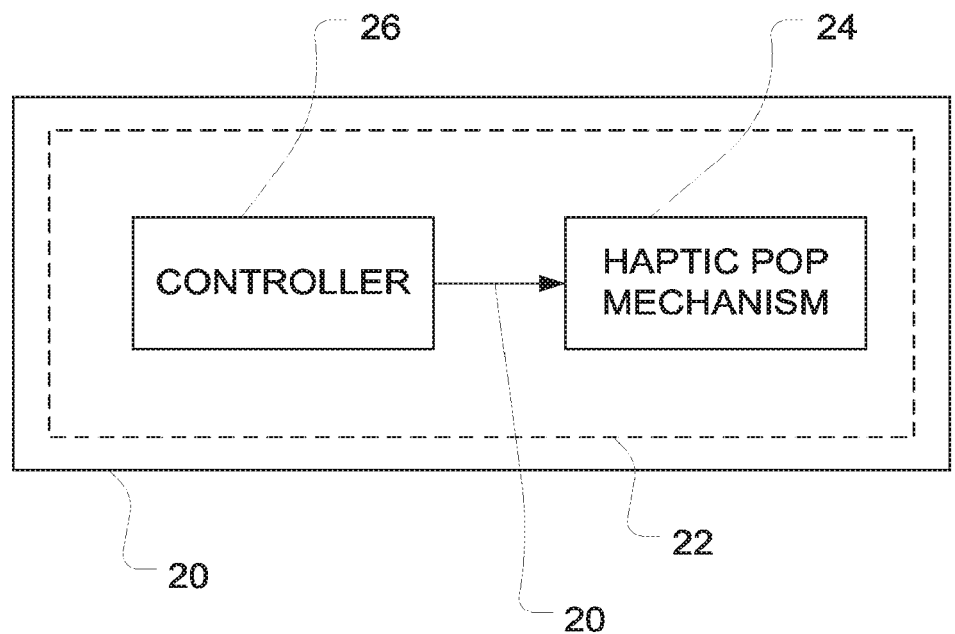
FIG. 1 illustrates an example of a block diagram of a portable device having a haptic pop mechanism, in accordance with one embodiment.

Disclosed herein are various embodiments of devices and methods for creating haptic pop effects, which can be used in devices such as mobile phones, tablet computers, video game controllers, and other handheld, wearable or portable devices. As described herein, a haptic pop effect (or a punching effect or snapping effect) is created when a haptic pop mechanism within a portable device rapidly releases energy (such as a burst of energy) so as to temporarily physically move or jolt the portable device. When a haptic pop effect occurs, a user holding, manipulating or otherwise in contact with the portable device experiences or feels the temporary movement of the portable device. Haptic pop effects as described herein can be provided within a mobile device in addition to or as a complement to traditional tactile feedback effects such as vibrational effects. In portable electronic devices, especially very small ones, a haptic pop effect allows a powerful haptic punch to be delivered to the user. This punch or pop effect is unlike any sensation that can be created with traditional actuators in the same amount of space.

In one example disclosed herein, a haptic feedback system includes a haptic pop mechanism having a material portion, such as a portion of metal, and a conductor such as Nitinol wire attached to the material portion, When current is applied to the conductor, the conductor contracts, shortens or changes shape which applies a force on the material portion until the material portion temporarily bends, deforms or moves and releases energy, thereby creating a haptic pop effect. Other embodiments of the disclosure are described herein.

The following detailed description refers to the accompanying drawings that depict various details of examples selected to show how particular embodiments may be implemented. The discussion herein addresses various examples of the inventive subject matter at least partially in reference to these drawings and describes the depicted embodiments in sufficient detail to enable those skilled in the art to make and use embodiments disclosed herein. Many other embodiments may be utilized for practicing the inventive subject matter than the illustrative examples discussed herein, and many structural and operational changes in addition to the alternatives specifically discussed herein may be made without departing from the scope of the inventive subject matter.

In this description, references to "one embodiment" or "an embodiment," or to "one example" or "an example" mean that the feature being referred to is, or may be, included in at least one embodiment or example. Separate references to "an embodiment" or "one embodiment" or to "one example" or "an example" in this description are not intended to necessarily refer to the same embodiment or example; however, neither are such embodiments mutually exclusive, unless so stated or as will be readily apparent to those of ordinary skill in the art having the benefit of this disclosure. Thus, embodiments within the scope of the disclosure may include a variety of combinations and/or integrations of the embodiments and examples described herein, as well as further embodiments and examples as defined within the scope of all claims based on this disclosure, as well as all legal equivalents of such claims.

FIG. 1 illustrates an example of a block diagram of a portable device 20 having a haptic feedback system 22 incorporating a haptic pop mechanism 24, in accordance with one embodiment. In this example, a haptic feedback system 22 for an electronic device 20 includes a controller 26 coupled with a haptic pop mechanism 24. The controller 26 is provided to selectively apply and remove one or more electrical signals 28 to the haptic pop mechanism 24 in order to activate the haptic pop mechanism 24. The controller 26 may include one or more circuits, switches, switchable current sources, or other conventional circuits or circuit configurations that controllably activate and deactivate the haptic pop mechanism 24. The controller may be implemented using a microprocessor or other logic device, and may be integrated into or separate from such microprocessor or other logic device.

The haptic pop mechanism 24 can generate a significant pop effect using a small form factor area, which thereby makes it desirable and/or useful to utilize within portable devices 20 such as smart phones, laptop computer, tablet devices, wearable devices, and other portable devices.

Figure 2:
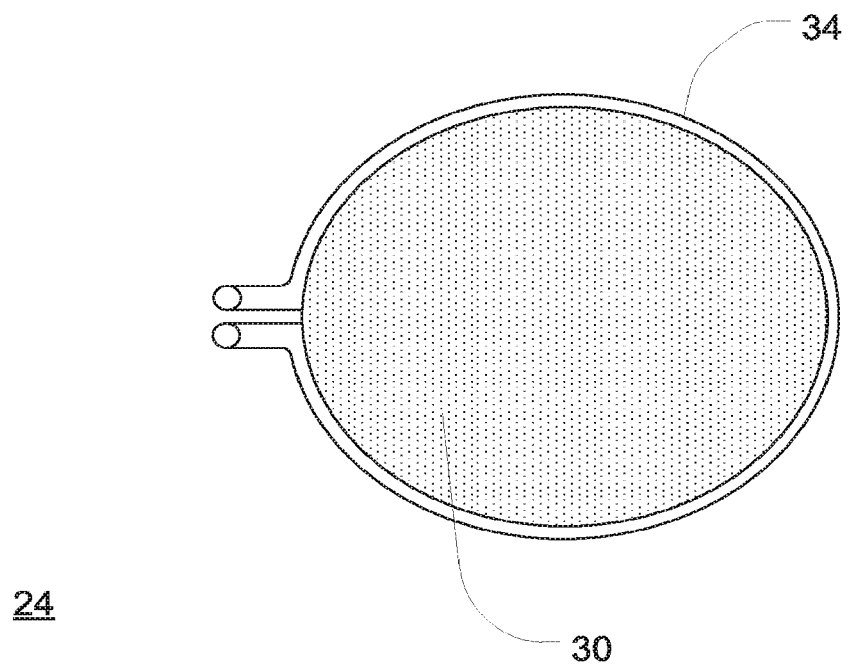
FIG. 2 illustrates an example of a haptic pop mechanism, in accordance with one embodiment.

In one example and referring to FIGS. 1-3, a haptic pop mechanism 24 includes a material portion or layer 30 such as a diaphragm, dome, or other layer which may be generally flat or may include an arcuate portion. The haptic pop mechanism 24 stores energy and then is capable of rapidly releasing energy accumulated in the material portion 30.

The material portion 30 may include bi-stable materials such as one or more metals or metal alloys, or materials configured or shaped in such a manner (such as a dome) as to have a spring-like characteristic where energy is released when force is applied to the material portion 30. The material portion 30 may be shaped in various configurations, such as circular, rectangular, square, oval, or other shapes or combinations thereof. The material portion 30 may include a rim 32 about its perimeter.

With a bi-stable material, exerting force on the material portion 30 causes the material portion 30 to switch state, bend, deform, or change shape or position, for instance from a concave to a convex shape, for example, and such change of shape creates a haptic pop effect. In one example, the material portion 30 could remain in a convex position until a second, opposite force is applied to the material portion 30 thereby returning the material portion 30 back to a concave position, which could also cause another haptic pop effect depending upon the implementation.

In other embodiments, the material portion 30 may not be bi-stable but may return to a default position after a force is applied to the material portion 30, thereby creating a haptic effect (e.g., releasing energy in the form of motion of the material portion 30). For instance, releasing or relaxing the force applied to the material portion 30 will cause the material portion 30 to return to its default position.

A haptic pop mechanism 24 may include one or more conductors 34 such as wires (such as an electrically conductive wire) attached or bonded on or about the rim 32 of the material portion 30. In one example, a wire, conductor or conductive layer 34 may be formed using nitinol metal or nickel titanium that can have elastic properties and shape memory, and can be responsive to changes in electrical signal 28 such as electrical current passing through the wire 24 and/or temperature/heat changes in the wire 34. Through the use of nitinol wire or other (40 in FIG. 3A) conductor 34, the wire 34 has a selectively controllable length or shape between a normal or first state (40 in FIG. 3A), and a second state (42 in FIG. 3B), as described below with reference to FIGS. 3A-3B. For purposes of simplicity, the terms wire, nitinol wire, conductor, and conductive layer are used interchangeably herein and are shown as conductor 34.

In another embodiment, an electroactive polymer may be used as conductor 34 to apply force to the material portion 30 to create a haptic pop effect. For instance, an electroactive polymer layer or structure 34 can be configured on or adjacent to the material layer 30, wherein when an electric field or other electric signal is applied to the electroactive polymer layer 34, the electroactive polymer layer 34 applies a force on the material layer 30 (either a bi-stable or non-bi-stable material) to thereby create a haptic pop effect.

In another embodiment, piezoelectric elements may be used as conductor 34 to apply forces to the material portion 30 to create a haptic pop effect. For instance, a piezoelectric layer, film or structure 34 can be configured on or adjacent to the material layer 30, wherein when a voltage or other electrical signal 28 is applied to the piezoelectric layer 40, the piezoelectric layer 40 applies a force on the material layer 30 (either a bi-stable or non-bi-stable material) to thereby create a haptic pop effect.

For instance and as shown in FIG. 2, a nitinol wire 34 may be bonded the material portion 30, wherein the nitinol wire 34 physically contracts or shortens when current 28 flows through it. The wire 34 may be attached or bonded directly to the material layer 30 or a rim or interface 32 may be provided therebetween.

Figure 3A:
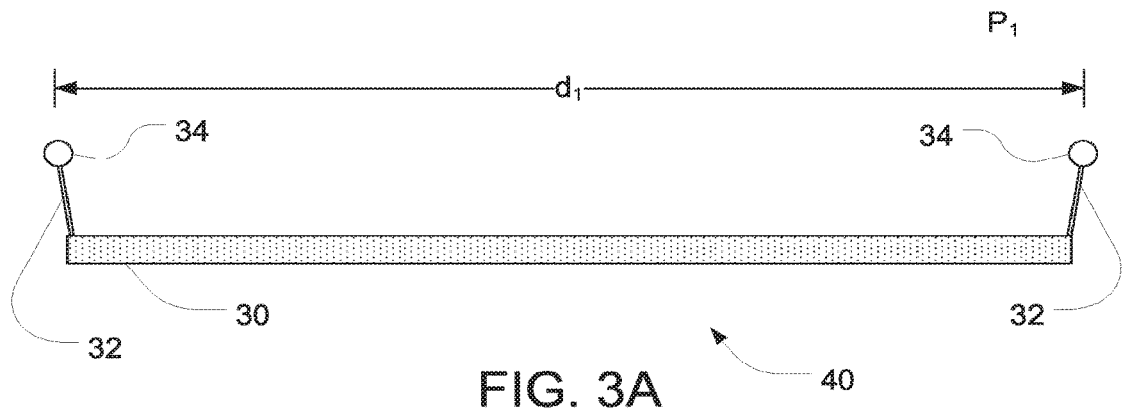
FIGS. 3A-3B illustrates a sectional view of an example of a haptic pop mechanism, in accordance with one embodiment.
Figure 3B:
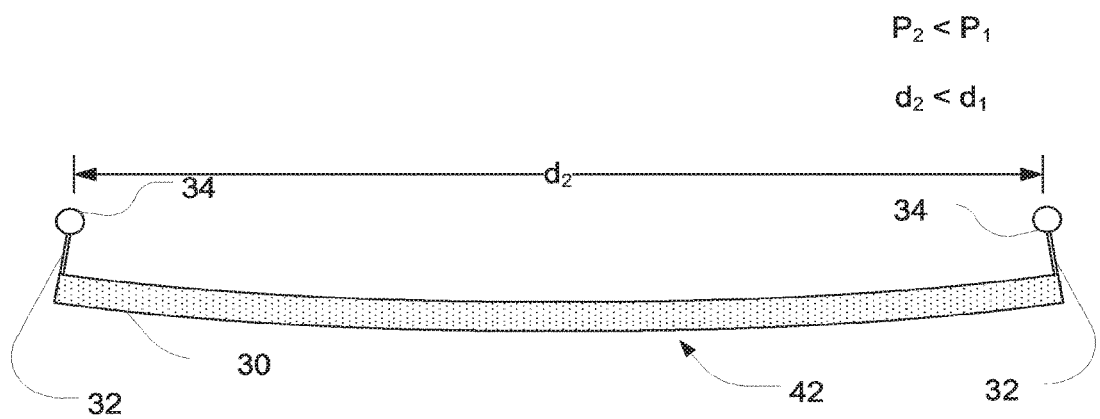

FIG. 3A shows a sectional view of an example of a haptic pop mechanism (such as 24 of FIG. 2) in a first normal state 40 at rest. In the normal state, the wire 34 attached to the material portion 30 defines a perimeter length shown as P1. To activate the haptic pop element, upon applying current 28 through the wire 34, the wire 34 in a second state 42 physically contracts and changes its shape such that its length (shown as P2) shortens so that P2 is less than its length P1 in the normal state 40. By shortening its length in the second state 42 and as shown in FIG. 3B, the wire 34 imposes force upon the material portion 30 and in response, the material portion 30 releases mechanical energy and creates the haptic pop effect (also described herein as a punching effect or snapping effect); this mechanical energy is then transferred to the portable device 20 and temporarily physically moves or jolts the portable device 20.

FIGS. 6-9, described below, illustrate other examples of haptic pop mechanisms 24 in accordance with other embodiments of the disclosure.

Figure 4:
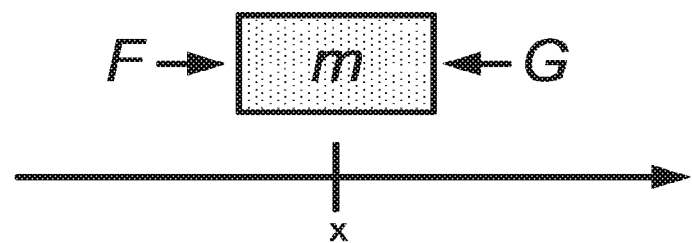
FIG. 4 illustrates an example of forces and movements of a haptic Pop mechanism, in accordance with one embodiment.
Figure 4:
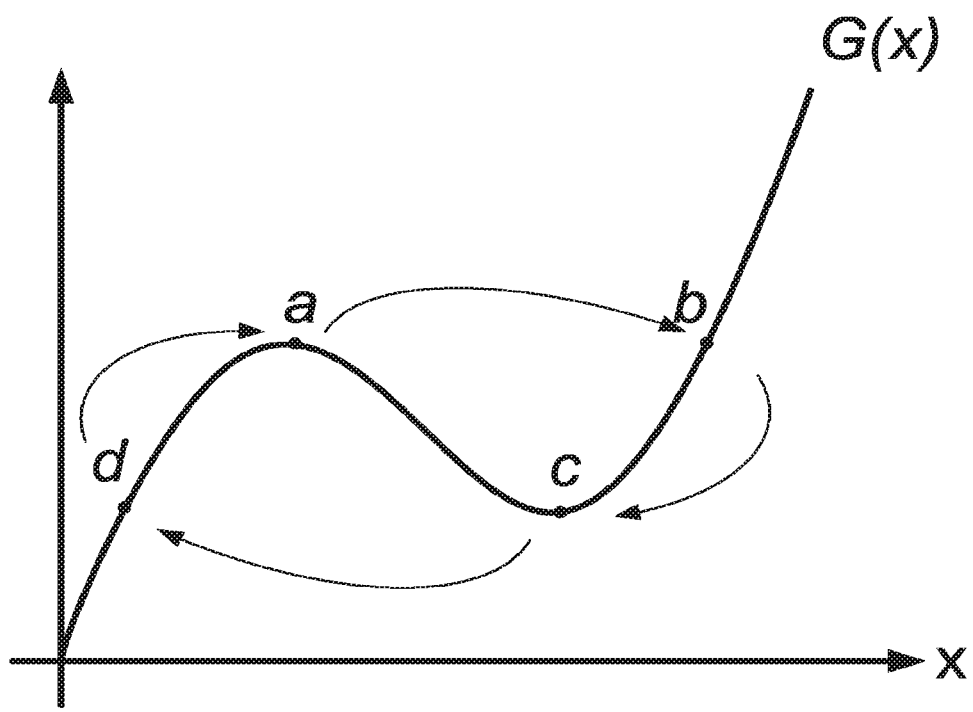

FIG. 4 illustrates an example of forces and movements of a haptic pop mechanism 24, in accordance with one embodiment. In one implementation, the material portion 30 (for instance, configured as a metallic dome) creates spring force element G, and Nitinol wire 34 bonded to the material portion 30 provides force F when under an electrical signal 28. As shown in the example of FIG. 4, Spring force G has a downward jog in its force deflection curve. As force F is slowly increased acting on a mass in opposition to spring force G, the mass moves to the right in FIG. 4. In FIG. 4, when the mass passes point a, the forces on it become unbalanced, and the mass rapidly accelerates to point b. The impact of the mass arriving at point b is felt by the user. As force F is reduced, the mass back moves to the left, reaching point c and then rapidly accelerating to point d, where the cycle is ready to begin again. This cyclic (hysteretic) behavior is a result of the non-linear spring element that produces G(x). G(x) may also depend on time and dx/dt.

Figure 5:
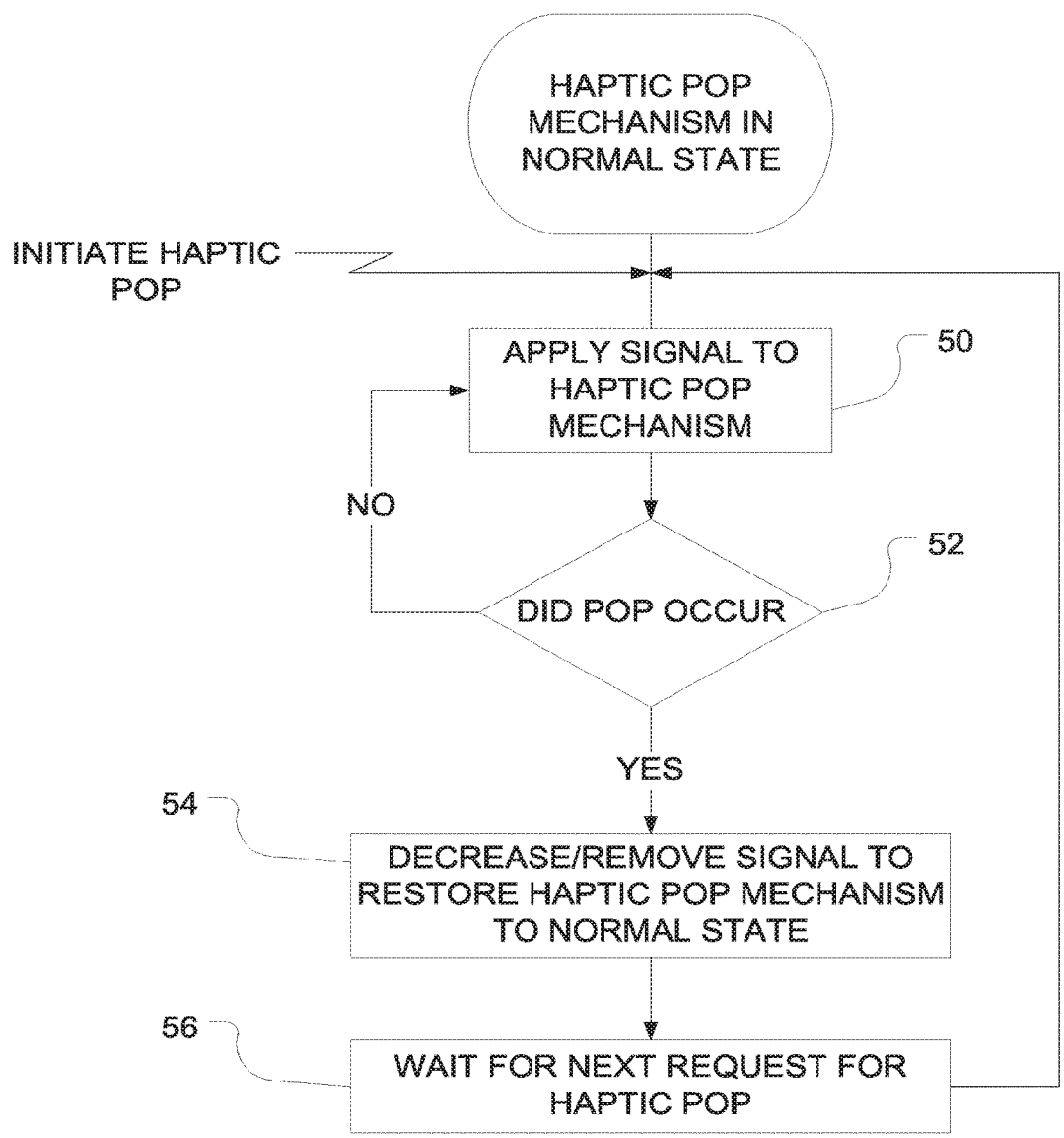
FIG. 5 illustrates an example of a process for activating a haptic pop effect, in accordance with one embodiment.
Figure 6A:
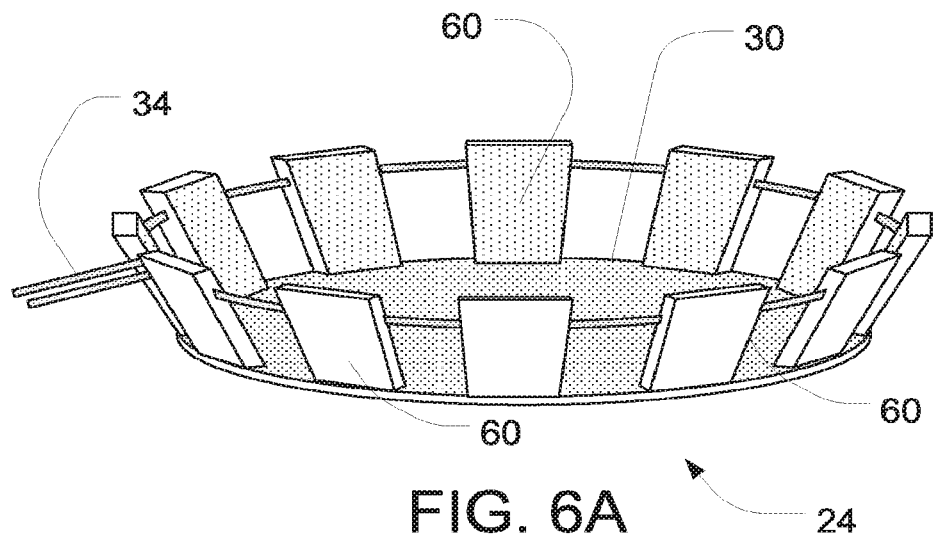
FIG. 6A-B illustrate another example of a haptic pop mechanism, in accordance with one embodiment.
Figure 6B:
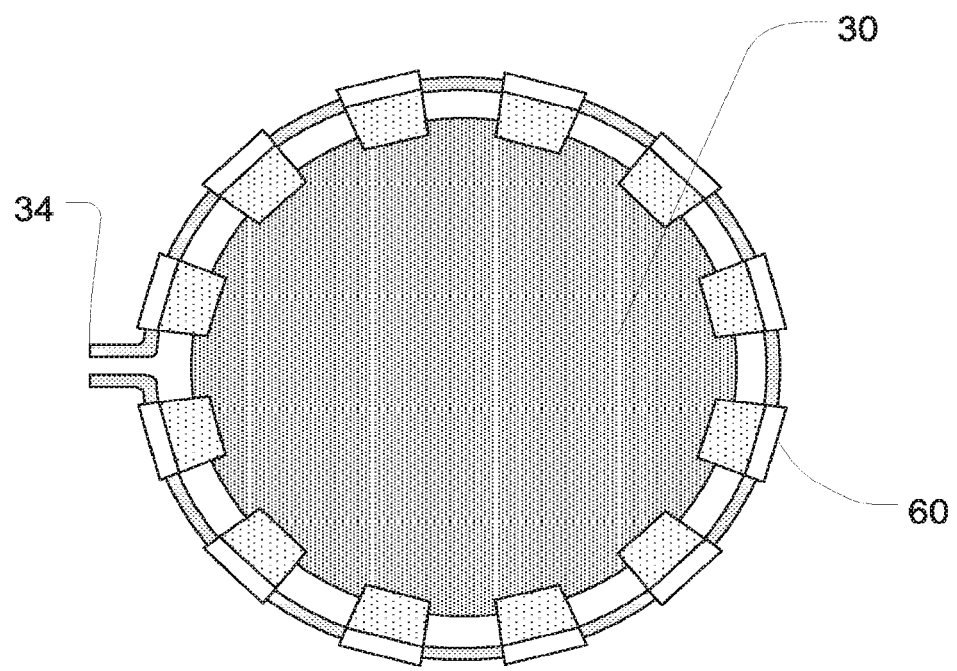

FIG. 5 illustrates an example of a process for activating a haptic pop effect, in accordance with one embodiment. FIG. 5 assumes that the haptic pop mechanism 24 is in its normal state, and that an event occurs within or is detected by the portable device 20 which calls for activation of the haptic pop mechanism 24. One or more operations illustrated in FIG. 5 can be implemented by the controller or by other logic within the portable device 20, a or a combination thereof.

At operation 50, upon receiving a request or command to activate or initiate a haptic pop effect, a signal is applied to the haptic pop mechanism in order to effectuate a haptic pop effect. In one example, the signal is an electrical signal such as a current injected into the haptic pop mechanism wire or conductive layer as described above. In another example, a voltage is applied to the wire such that current flows through the wire; in another example, the wire is heated to a temperature such that it induces a desired physical change in the wire or conductive layer.

Operation 52 detects whether the haptic pop effect has occurred in response to operation 50, and if not, the signal at operation 50 is maintained or increased if desired in order to activate the haptic pop mechanism. Once the haptic pop mechanism physically pops, operation 52 passes control to operation 54. In one example, operation 52 detects motion of the portable device—such as through accelerometer data or motion data—such as a level of motion or rate of acceleration within an expected range of motion or acceleration as created by the haptic pop mechanism, so that the controller or portable device can differentiate movement or acceleration caused by the haptic pop mechanism versus as caused by movement by the user. It is understood that operation 52 is optional depending upon the particular implementation.

Having detected at operation 52 that the haptic pop occurred, control is passed to operation 54 which decreases or removes the signal applied to the haptic pop mechanism at operation 50, so as to restore the haptic pop mechanism to its normal state.

Operation 56 waits for the next request for a haptic pop effect from the portable device, and when such request is received, control is passed to operation 50 to repeat operations 50-56.

FIGS. 6-9 illustrate other examples of haptic pop mechanisms 24 in accordance with other embodiments of the disclosure. Referring to FIG. 6, a haptic pop mechanism 24 is formed having a generally flat flexible material portion 30, a set of spaced protrusions or tines 60 extending from the perimeter of material portion 30, and one or more conductors 34 attached to the protrusions 60 in a loop configuration. In one example, as an electrical signal 28 is applied to the conductors 34, the conductors 34 contract or change shape, which move the tines 60 radially inwardly thereby imposing forces upon perimeter of the material portion 30 so that the material portion 30 bends to create a haptic pop effect.

Figure 7:
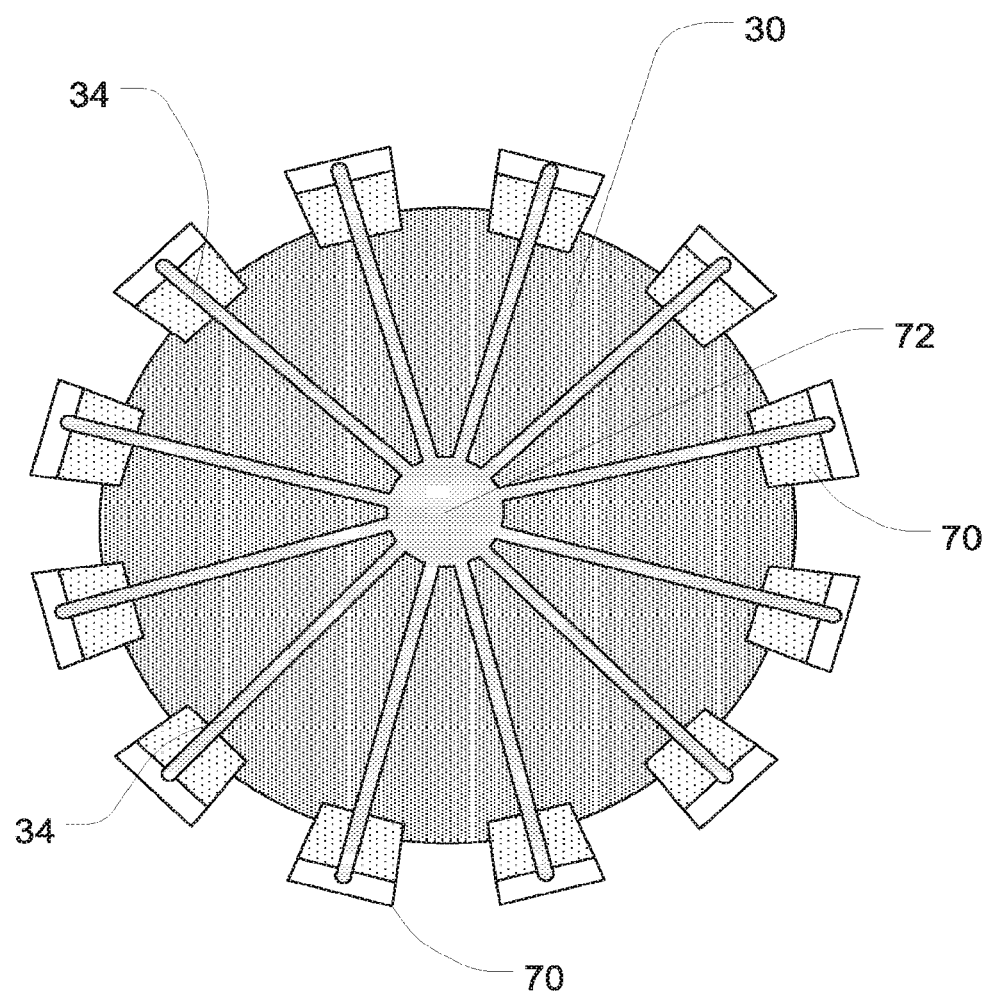
FIG. 7 illustrate another example of a haptic pop mechanism, in accordance with one embodiment.

In another example illustrated in FIG. 7, a haptic pop mechanism 24 is formed having a generally flat flexible material portion 30, a set of spaced protrusions or tines 70 extending from the perimeter of material portion 30, and one or more conductors 34 attached to the protrusions 70 and radiating out from a central point 72. In one example, as an electrical signal 28 is applied to the conductors 34, the conductors 34 contract or change shape so as to move the tines 70 radially inwardly thereby imposing forces upon perimeter of the material portion 30 so that the material portion 30 bends to create a haptic pop effect.

Figure 8:
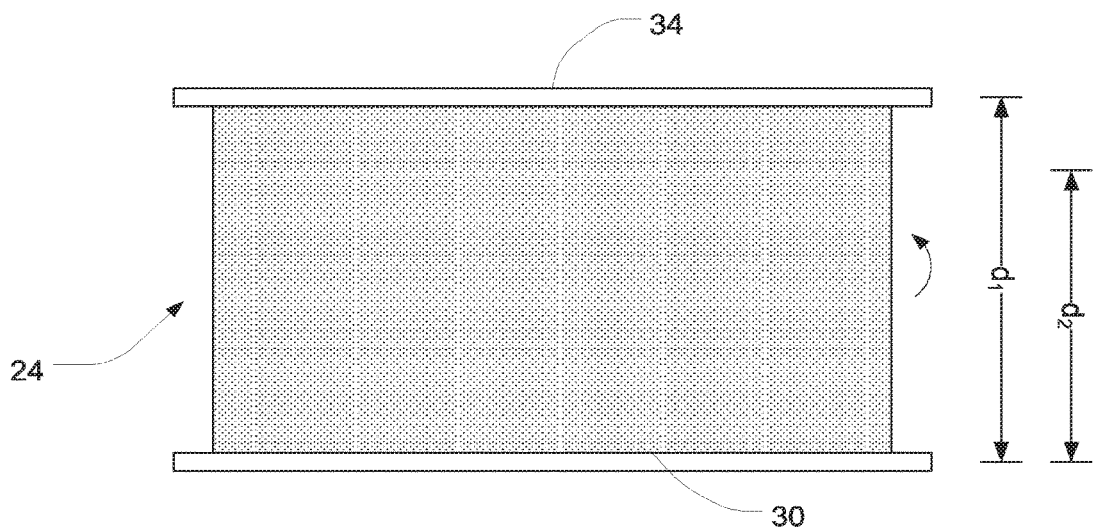
FIG. 8 illustrates another example of a haptic pop mechanism, in accordance with one embodiment.
Figure 9:
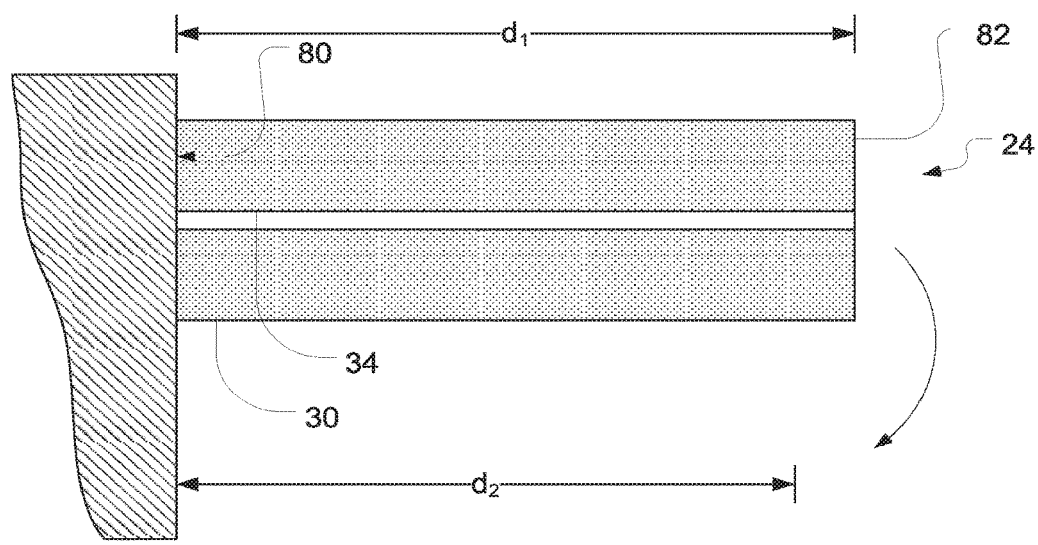
FIG. 9 illustrates another example of a haptic pop mechanism, in accordance with one embodiment.

As discussed herein, 9 haptic pop mechanism 24 can be configured using various shapes with different conductor orientations. FIGS. 8-9 show examples of other embodiments wherein the material portions 30 of the haptic pop mechanisms 24 are formed using differing shapes. It is understood that the shapes of the haptic pop mechanisms 24 can take various forms depending on the particular implementations.

In the example of FIG. 8, a haptic pop mechanism 24 is formed having a generally flat flexible material portion 30 in a generally rectangular shape, with two or more conductors 34 attached to opposing ends of the rectangular material portion 30. As an electrical signal 28 is applied to the conductors 34, the conductors 34 contract or change shape so as to move the opposing ends of the material portion 30 towards one another, so that the material portion 30 bends to create a haptic pop effect.

In the example of FIG. 9, a haptic pop mechanism 24 is formed having a generally flat flexible material portion 30 in a generally rectangular shape, with one end 80 of the material portion anchored or fixed, and the other end 82 of the material portion 30 subject to the movement or contracting force of one or more conductors 34 attached axially along the rectangular material portion 30. As an electrical signal 28 is applied to the conductor(s) 34, the conductor 34 contracts or changes shape so as to move the free end 82 of the material portion 30 moves or bends towards the fixed end 80 of the material portion 30 to create a haptic pop effect.

The snap of a haptic pop mechanism 24 may be controlled by numerous factors, in accordance with embodiments of the disclosure. In one example, the geometry (i.e., shape), thickness and materials of the diaphragm or material portion 30 can be varied to create differing magnitude of haptic pop effect. If the haptic pop in the material portion 30 is unbalanced, if desired an off center feature (e.g., hole) can be placed in the diaphragm or material portion 30 to help control the motion.

The positioning of the haptic pop mechanism 24 within the portable device 20 can also be varied to create differing levels of effect. In one example, a haptic pop mechanism 24 may be positioned underneath or proximate to a button or control of the portable device 20, or may be positioned beneath or proximate to a touchscreen or other input device.

In one example, multiple haptic pop mechanisms 24 may be distributed throughout various locations within the portable device 20. Each haptic pop mechanism 24 may include its own controller 26, as shown in FIG. 1, or a controller 26 may be configured to control multiple haptic pop mechanisms 24.

In another example, the diaphragm rim (such as at tines 60 in FIGS. 6A-6B) may be actuated at multiple points using multiple wires or conductors coupled thereto. The character of the diaphragm or material portion 30 snap could be affected by the sequence and timing of these actuations.

In another example, if desired, a dampener or dampening layer could be positioned adjacent to or in contact with or integrated with the haptic pop mechanism 24 in order to regulate or control the amount of pop effect created by the haptic pop mechanism 24. For instance, multiple differing magnitudes of haptic pop can be created using the same haptic pop mechanism 24 but varying an amount of controlled dampening applied to the haptic pop mechanism 24 during the creation of each haptic pop effect. One example of a dampener can include a small bladder of ferro-fluid positioned adjacent to the haptic pop mechanism 24, wherein the viscosity of the bladder (and therefore the bladder's dampening characteristics) is controlled by a magnetic field which can be regulated by the controller 26 or other logic within the portable device 20.

In another example, if desired, various embossing and stamping patterns can be implemented on the diaphragm or material portion 30 in order to control or regulate the magnitude or characteristics of the pop effect of the haptic pop mechanism 24.

Hence, it can be seen that various embodiments provide for creating a haptic pop effect that can be used in portable devices such as but not limited to mobile phone, tablet computers, game controllers, watches, music and multimedia players, or other devices, depending upon the particular implementation.

While the methods disclosed herein have been described and shown with reference to particular operations performed in a particular order, it will be understood that these operations may be combined, sub-divided, or re-ordered to form equivalent methods without departing from the teachings of the embodiments herein. Accordingly, unless specifically indicated herein, the order and grouping of the operations is not a limitation of the disclosed embodiments.

It should be appreciated that in the foregoing description of exemplary embodiments, various features of the embodiments disclosed herein are sometimes grouped together in a single embodiment, figure, or description thereof for the purpose of streamlining the disclosure and aiding in the understanding of one or more of the various inventive aspects. This method of disclosure, however, is not to be interpreted as reflecting an intention that the claimed embodiments require more features than are expressly recited in each claim. Rather, inventive aspects lie in less than all features of a single foregoing disclosed embodiment, and each embodiment described herein may contain more than one inventive feature.

While the embodiments have been particularly shown and described herein, it will be understood by those skilled in the art that various other changes in the form and details may be made without departing from the spirit and scope of the disclosure.

We claim:

1. A haptic feedback system for a portable device, comprising:
   a mechanism, configured to produce a haptic pop effect, comprising:
      a material portion that releases mechanical energy when temporarily bent from a first position to a second position, the material portion comprising one or more discrete protrusions at a perimeter of the material portion; and
      a conductor that changes shape in response to an electrical signal applied thereto, the conductor connected with the material portion at the one or more discrete protrusions; and
   a controller electronically coupled with the conductor to selectively provide the electrical signal to the conductor to cause the mechanism to produce the haptic pop effect.

2. The system of claim 1, wherein the mechanism has a first normal state having said mechanical energy stored therein, and a second state wherein said mechanical energy is released, thereby producing the haptic pop effect.

3. The system of claim 1, wherein the material portion is configured as a dome-shaped diaphragm.

4. The system of claim 3, wherein the conductor comprises a Nitinol wire bonded to the one or more discrete protrusions.

5. The system of claim 1, wherein the material portion is made of metal.

6. The system of claim 1, wherein the material portion has a generally flat profile with a generally circular shape.

7. The system of claim 1, wherein the conductor includes Nitinol material.

8. The system of claim 1, wherein the conductor has a variable length of a first length to a shorter second length in response to the electrical signal being applied thereto.

9. The system of claim 1, further comprising:
   a dampener positioned adjacent to the mechanism; wherein,
   the dampener comprises a bladder of ferro-fluid having a viscosity controlled by a magnetic field; and
   the magnetic field is regulated by the controller.

10. The system of claim 1, wherein:
    the one or more discrete protrusions comprise a rim at the perimeter of the material portion; and
    the conductor is attached to the material portion at the rim.

11. The system of claim 1, wherein:
    the one or more discrete protrusions comprise a set of tines at the perimeter of the material portion; and
    the conductor is attached to the material portion at each tine in the set of tines.

12. The system of claim 1, further comprising:
    a touchscreen; wherein,
    the mechanism is positioned proximate to the touchscreen, within the portable device, and configured to deliver the haptic pop effect to the touchscreen.

13. The system of claim 12, wherein:
    the mechanism is a first mechanism in a set of multiple haptic pop mechanisms comprising an additional set of the elements included in the first mechanism; and
    the set of multiple haptic pop mechanisms are positioned at various locations within the portable device.

14. The system of claim 1, further comprising:
    a button; wherein, the mechanism is positioned proximate to the button, within the portable device, and configured to deliver the haptic pop effect to the button.

15. A method of providing haptic feedback in an electronic device, the method comprising:
providing a mechanism selectable between a first state and a second state in response to an electrical signal applied to the mechanism at a set of one or more discrete protrusions at a perimeter of the mechanism, wherein the first state of the mechanism stores mechanical energy, and a transition of the mechanism from the first state to the second state releases the stored mechanical energy to produce a haptic pop effect;
detecting a request for producing the haptic pop effect; and
providing the electrical signal to the mechanism;
whereby in response to the electrical signal, the mechanism transitions into the second state thereby producing the haptic pop effect.

16. The method of claim 15, wherein the electrical signal comprises a current.

17. The method of claim 15, wherein providing the mechanism comprises:
providing a metal material configured with a dome-like portion; wherein,
the set of one or more discrete protrusions are at the perimeter of the dome-like portion.

18. The method of claim 17, wherein providing the mechanism comprises:
providing a Nitinol wire, wherein the Nitinol wire is coupled with the electrical signal; and
bonding the Nitinol wire to the set of one or more discrete protrusions.

19. A haptic feedback system for a portable device, comprising:
a mechanism, configured to produce a haptic pop effect, comprising:
a material portion that releases mechanical energy when bent from a first position to a second position, the material portion comprising one or more discrete protrusions at a perimeter of the material portion; and
a Nitinol wire connected with the material portion at the one or more discrete protrusions; and
a controller electronically coupled with the Nitinol wire to selectively activate the mechanism, wherein when the controller applies an electrical signal to the Nitinol wire, the Nitinol wire exerts a bending force on the material portion to bend the material portion to the second position, thereby producing the haptic pop effect.

20. The system of claim 19, wherein the material portion is dome shaped.

* * * * *